US006849211B2

(12) United States Patent
Järvinen et al.

(10) Patent No.: US 6,849,211 B2
(45) Date of Patent: Feb. 1, 2005

(54) METHOD FOR FABRICATING A CONCRETE PRODUCT

(75) Inventors: Lassi Järvinen, Valkeakoski (FI); Arto Lähteenmäki, Valkeakoski (FI); Aimo Seppänen, Sääksmäki (FI)

(73) Assignee: Addtek Research & Development Oy AB, Vantaa (FI)

( * ) Notice: Subject to any disclaimer, the term of this patent is extended or adjusted under 35 U.S.C. 154(b) by 256 days.

(21) Appl. No.: 10/144,732

(22) Filed: May 15, 2002

(65) Prior Publication Data

US 2003/0003173 A1 Jan. 2, 2003

(30) Foreign Application Priority Data

Jun. 27, 2001 (FI) ............................................ 20011382

(51) Int. Cl.[7] ............................ B28B 3/22; B28B 3/20; B28B 13/02; B29C 39/14; B29C 39/44

(52) U.S. Cl. ....................... 264/33; 264/40.5; 264/40.7; 264/70; 264/209.1; 264/211.11; 425/64; 425/145; 425/150

(58) Field of Search .............................. 264/40.5, 40.7, 264/70, 209.1, 211.11, 228, 229, 33; 425/64, 145, 150

(56) References Cited

U.S. PATENT DOCUMENTS

| | | | | | |
|---|---|---|---|---|---|
| 3,292,227 | A | * | 12/1966 | Olds | 425/214 |
| 3,608,011 | A | * | 9/1971 | Jones | 264/70 |
| 3,792,133 | A | * | 2/1974 | Goughnour | 264/33 |
| 3,915,584 | A | * | 10/1975 | Coho et al. | 404/98 |
| 5,023,030 | A | | 6/1991 | Rantanen | 264/40.5 |
| 5,198,235 | A | * | 3/1993 | Reichstein et al. | 425/62 |
| 2003/0057597 | A1 | * | 3/2003 | Seppanen et al. | 264/228 |
| 2003/0151153 | A1 | * | 8/2003 | Jarvinen et al. | 264/33 |
| 2003/0227102 | A1 | * | 12/2003 | Sahala et al. | 264/86 |
| 2004/0051193 | A1 | * | 3/2004 | Seppanen | 264/33 |

FOREIGN PATENT DOCUMENTS

| | | |
|---|---|---|
| EP | 0 541 963 A1 | 5/1993 |
| FI | 97455 | 4/1993 |
| GB | 1586181 A | 3/1981 |

* cited by examiner

*Primary Examiner*—Michael P. Colaianni
*Assistant Examiner*—Michael I. Poe
(74) *Attorney, Agent, or Firm*—Burns, Doane, Swecker & Mathis, LLP

(57) ABSTRACT

A method is provided are for fabricating a concrete product in a substantially horizontal slip-form casting process, in which method concrete mix is fed into a slip-form mold of a defined cross section moving progressively in the casting process so as to give a concrete product of a desired shape. The input power need of the concrete mix feed and compaction is measured, whereupon the travel resistance of the casting machine is controlled based on the value of a measured process variable. Therefore, quality variations in a slip-form cast product that are caused by changes in the density of the concrete mix and the travel resistance of the casting machine are eliminated.

2 Claims, 2 Drawing Sheets

METHOD FOR FABRICATING A CONCRETE PRODUCT

FIELD OF THE INVENTION

The present invention relates to a method for fabricating prestressed concrete products by a slip-form casting method, whereby the concrete mix is fed onto the casting bed at a constant pressure by means of auger feeders. The invention also relates to a slip-form casting system for fabricating prestressed concrete products, whereby the apparatus comprises a slip-form casting machine which is adapted movable on wheels running along a casting bed, forms a mold in cooperation with side walls and a top plate, has its auger feeders connected to a drive machinery and is equipped with a constant-torque device for keeping the feed pressure exerted by the auger feeders at a constant value.

BACKGROUND OF THE INVENTION

In a slip forming process, the concrete mix is extruded with the help of auger feeders into a mold or through nozzles, whereby the casting machine is propelled along the casting bed by the reaction forces imposed on the auger feeders. The ready-cast product remains on the casting bed.

A major problem in concrete products fabricated by slip-form casting is related to strength variations in the ready-cast product that are mainly caused by uneven compaction of concrete mix over the entire casting operation. As the casting machine moves propelled by the extrusion pressure exerted by the auger feeders, variations in the travel resistance and composition of concrete mix are reflected on the pressure generated by the auger feeders and, thereby, on the compaction of the concrete mix. Variations in the travel resistance are partly caused by changes in the weight of the casting machine due to variations in the amount of concrete mix in the feed hopper of the casting machine and partly due to changes in the travel resistance invoked by the pretensioning wires. Depending on the type of product, the resistance imposed by the pretensioning wires on the wire guides of the casting machine may vary widely due to the different number of wires used in various kinds of slabs. The number of wires in different slab types is determined by the design load-bearing capability and span of the slab. Respectively, the degree of compaction attained in a given concrete mix is affected by aggregate size distribution and proportion in the mix, as well as by the moisture content of the concrete mix.

In patent publication FI 97455 is disclosed a method wherein the degree of compaction in the concrete mix is sensed indirectly by measuring the input power to a top troweling beam and then the compaction movement or concrete mix feed rate is controlled. However, as such a casting machine travels propelled by the reaction force of the extrusion pressure alone, this method is incapable of fabricating a sufficiently tightly compacted product if the casting machine happens to run too easily at a low travel resistance.

In patent publication GB B 1 586 181 is disclosed an embodiment wherein the travel speed of the casting machine is kept maximally constant by controlling the input power or reaction force of the auger feeders, thus aiming to achieve a constant degree of compaction in all parts of the cast product. However, casting at a constant speed does not guarantee uniform compaction with varying qualities of the concrete mix.

In patent publication FI 84575 is disclosed a method wherein is measured the pressure imposed on the internal walls of the mold section of a casting machine. However, pressure measurement at the mold walls is not particularly well suited for controlling the compaction of concrete mix because even at a constant external pressure, a nonuniform degree of compaction may occur in a concrete mix due to its varying moisture content. The auger feeder only produces the extrusion pressure but does not actively contribute to the compaction of the concrete mix. All known methods are incapable of sensing the degree of compaction in a concrete mix by way of a direct measurement performed on the concrete mix during an on-going slip-form casting cycle.

SUMMARY OF THE INVENTION

It is one of the objects of the present invention to provide a new measurement method for sensing the compaction of slip-form cast concrete mix and, based on this measurement value, controlling the operation of a casting machine to obtain a desired end result.

The goal of the invention is achieved by way of measuring the input power to one or more auger feeders of the casting machine or the value of a variable proportional thereto, processing the value of the variable computationally in a control unit and, based on the result of the computation, controlling the factor of greatest contribution to the final degree of compaction, namely, the travel resistance of the casting machine.

In an extruder-type slip-form casting machine wherein the auger feeders also perform a longitudinal reciprocating motion, the compaction of concrete mix is based partially or entirely on the compacting action of the auger feeders in the fashion explained, e.g., in the description part of Finnish Utility Model Application HM 3160. While longitudinal motion of auger feeders is also described in many other patent publications, such as FI 85350 and FI 80845, these systems additionally utilize other compaction means.

By way of measuring the input power of the auger feeders, the degree of compaction over the entire cross-sectional area of the concrete product can be controlled through adjusting the compacting effect of the auger feeders. As the concrete mix undergoes compaction between the longitudinally reciprocating flights of the augers while the augers simultaneously generate the required extrusion pressure, it is possible to make the degree of compaction in the concrete mix uniform over the entire cross section of the product. Hence, if the input power of the auger feeders is kept constant, the degree of compaction can be controlled to a uniform value which is not affected by changes in the concrete mix composition or the external travel resistance variables. Thus, casting of different types of products having a varying number of pretensioning wires and, therefore, exhibiting different travel resistances, may always be carried out so that a desired end result is attained. In fact, the different numbers of wires represent the major cause of change in the degree of compaction from one type of cast product to another.

When a large number of pretensioning wires is used in the product, the wires cause a high resistance at the pretensioning wire guides of the casting machine, whereby the travel of the casting machine propelled by the reactive force of the concrete mix extrusion must be augmented by means of a constant-torque drive. Conversely, a small number of wires may cause a low-resistance situation that fails to achieve a sufficiently high degree of compaction inasmuch the casting machine starts to move even under a low reactive force of extrusion. Herein, the constant-torque drive must provide additional resistance to assure a desired degree of compaction.

Due to the compaction exerted by the auger feeders, also the power consumption of the top troweling beam correlates with the degree of compaction in the cast concrete. Hence, the desired degree of compaction may also be gained by measuring the input power of the top troweling beam drive and then controlling the constant-torque drive appropriately.

BRIEF DESCRIPTION OF THE DRAWING

Next, the invention will be examined in greater detail by making reference to the attached drawings, wherein.

DESCRIPTION OF THE PREFERRED EMBODIMENT

Figure 1:
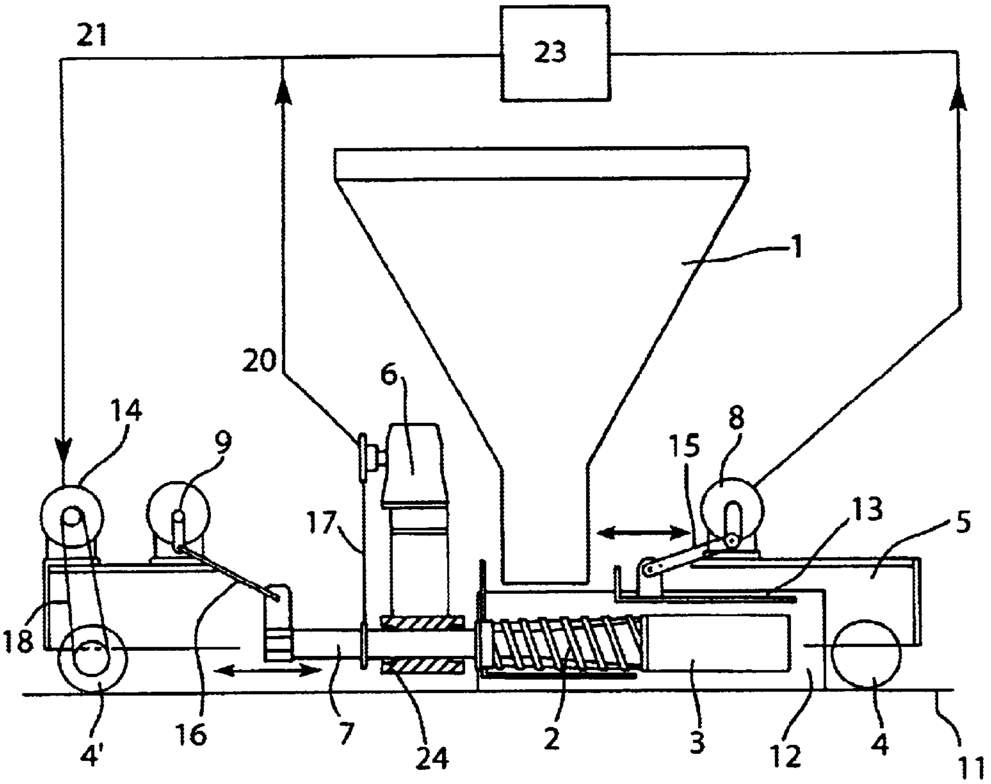
FIG. 1 shows a partially sectional view of a casting apparatus according to the invention.

An extruder-type slip-form casting machine according to the invention is adapted to move on support wheels 4, 4' along the side rails of a mold 11. The apparatus is assembled on a framework 5. In the illustrated exemplary embodiment, the casting machine is provided with three conical auger feeders 2. The augers 2 are mounted on the framework 5 so as to be supported by rotary auger drive shafts 7. At the opposite end of the augers 2 in regard to the travel direction of the augers 2 are adapted core-shaping mandrels 3. The auger drive shafts 7 are connected by a crank mechanism 16 to the drive motor 9 of the compaction system, while the auger drive shaft is connected by a chain transmission 17 to the drive motor 6 of the augers. The auger drive shafts 7 are supported by sleeve bearings 24 thus permitting the longitudinal reciprocating motion and the rotary movement of the augers to take place simultaneously. At the ingoing end of the auger feeders 2, above the machinery, is adapted a conical concrete mix feed hopper 1. Next to the feed hopper 1 in opposite direction to the casting travel are located a top troweling beam 13 above the casting machine and side troweling beams 12 at the sides of the machine. The top troweling beam 13 is connected by a crank mechanism 15 to the drive machinery 8 of the top troweling beam. The side troweling beams are connected by a crank mechanism 19 to the drive machinery 10 of the side troweling beams. The support wheels 4' located at the front end of the framework 5 in regard to its travel are connected by a chain transmission 18 to a constant-torque drive machinery 14. A measurement signal line 20 is taken from the drive motor 6 of the auger feeders to a control unit 23, wherefrom a control signal line 21 is taken further to the constant-torque drive machinery 14. The control unit 23 also receives measurement signal lines 22 from the top troweling beam drive machinery 8 and/or the side troweling beam drive machinery 10.

The operation of the apparatus is as follows. Concrete mix poured into the feed hopper 1 flows onto the feed augers 2 that are rotated by a drive machinery 6. The rotating feed augers 2 extrude the concrete mix into a pressurized space that is continued as a molding space delineated by the mold 11, the side troweling beams 12 and the top troweling beam 13. In this space, the concrete mix is forced into the spaces remaining between the core-shaping mandrels 3 and the mold-delineating walls 12, 13 so as to become compacted under the combined effect of the movements and the pressure exerted by the auger feeders 2, the core-shaping mandrels 3 and the walls 12, 13 thus assuming the shape of the desired end product 25 such as a hollow-core slab, for instance.

Figure 2:
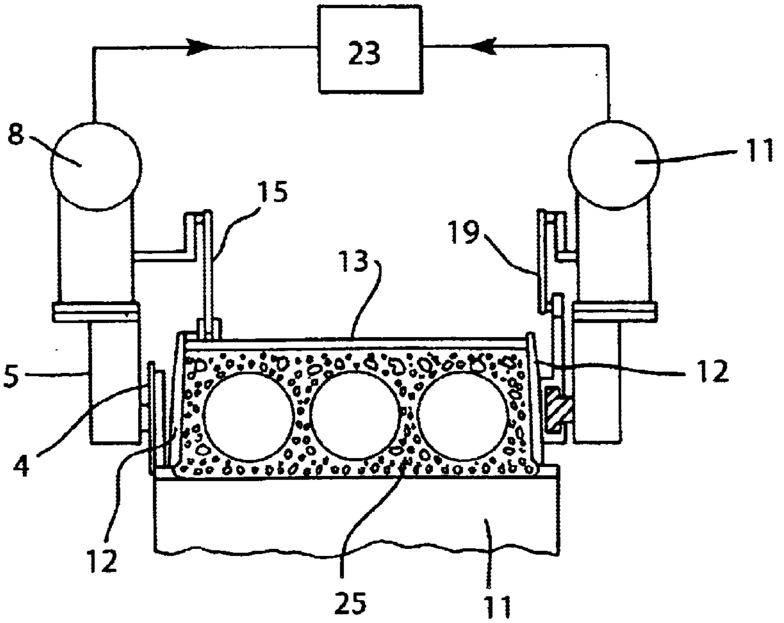
FIG. 2 shows a cross-sectional view of the apparatus of FIG. 1 at its troweling beams.
Figure 3:
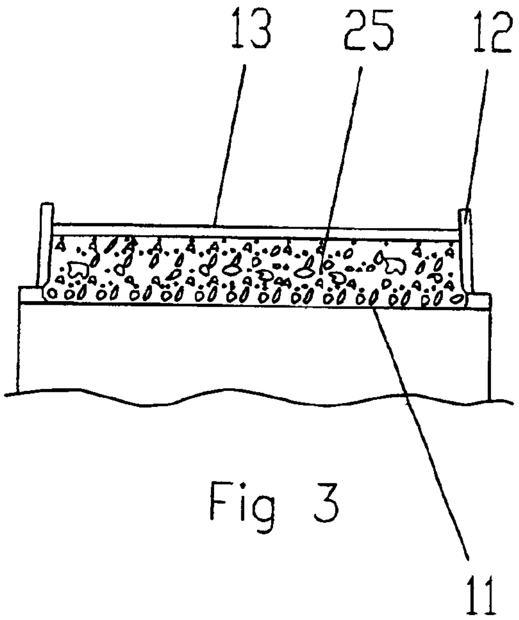
FIG. 3 shows the cross section of an exemplary embodiment of a thin solid-core slab product to be fabricated.
Figure 4:
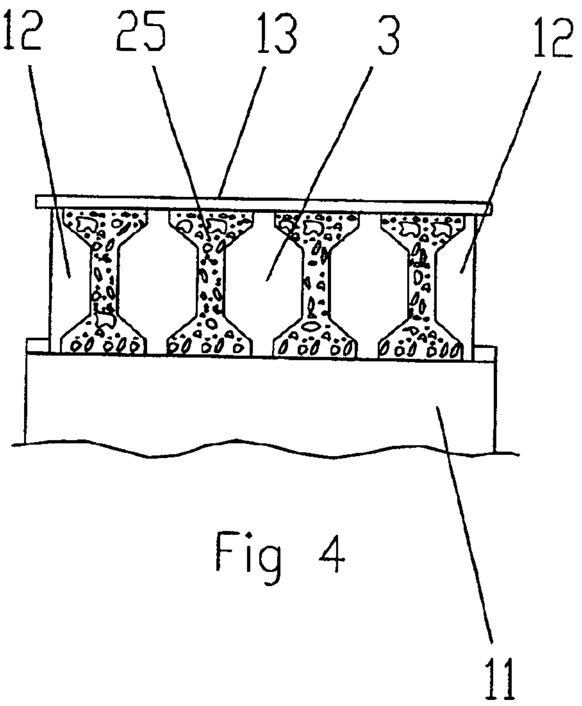
FIG. 4 shows the cross section of another exemplary embodiment of a slab product to be fabricated.

The apparatus is controlled so that the input power of the drive motor 6 of the auger feeders is first measured directly or indirectly. The variable selected to be measured is determined by the type of drive power, whereby it may be the motor drive current or the pressure of a hydraulic motor drive line that is communicated in an appropriate manner to the actuators and control unit used in the system. When hollow-core beams such as those shown in FIG. 2 and similar slab-like products are being fabricated, an advantageous approach is to measure the input power to the drive motor 6 of the auger feeders. However, in the fabrication of thin slab-like products, it is very advantageous to measure the input power of both the drive motor 6 of the feeder augers and the drive motor 8 of the top troweling beam. In the fabrication of products similar to the I-beam shown in FIG. 3, the input power measurement of drive motor 6 is complemented with the input power measurement of drive motor 10 of the side-troweling beams.

As known in the art, the input power measurement of the feeder drive motor or a measurement value proportional thereto gives a good figure on the energy needed for compacting the concrete mix and on the overall energy required to attain a desired end result. If the stiffness of the concrete mix increases, its deformability and workability deteriorates whereby also the need for more input power and higher pressure in the compaction space increases. The same occurs if larger aggregate is used in the concrete mix or the proportion of crushed stone is elevated.

The value of measured variable is taken to the control unit 23 that computes control signal values for adjusting the torque output of the constant-torque drive 14 so as to augment or retard the travel of the casting machine properly for keeping the extrusion pressure and degree of compaction at constant levels. The control strategy is based on known rules according to which the extrusion pressure at the feeder augers increases with stiffer compositions of the concrete mix and higher number of pretensioning wires. Simultaneously also the input power of the feeder augers increases. Hereby, the constant-torque drive is controlled to augment the travel of the casting machine. In contrast, when the concrete mix moisture content is high or a small number of wires are used, the internal pressure of the concrete mix being cast and the input power of the feeder augers remain too low to give a desired degree of compaction unless the travel resistance is increased by controlling the constant-torque drive to provide a retarding torque.

The constant-torque drive can be implemented using, e.g., an inverter-controlled electric motor as the actuator. Controlled brakes may be used as auxiliary devices for generating the retarding torque.

What is claimed is:

1. A method for fabricating a concrete product in a substantially horizontal slip-form casting process, in which method concrete mix is fed into a slip-form mold of a defined cross section moving progressively in a casting process so as to give a concrete product of a desired shape, whereby in the method, the progressive travel of the mold of defined cross section is subjected to a controlled travel resistance based on an input power of concrete mix feed to obtain compaction of the extruded concrete mix and propulsion of the casting machine, the method comprising the step of:

measuring the input power need of the concrete mix feeds;

measuring input power need of surface troweling; and controlling the travel resistance of the casting machine based on values of the measurements.

2. The method of claim 1, further comprising the step of controlling the travel resistance in one of a positive direction and a negative direction.

* * * * *